US008473460B2

(12) United States Patent
Ritz et al.

(10) Patent No.: US 8,473,460 B2
(45) Date of Patent: Jun. 25, 2013

(54) DRIVER MODEL FOR REPLACING CORE SYSTEM HARDWARE

(75) Inventors: Andrew J. Ritz, Sammamish, WA (US); Santosh S. Jodh, Sammamish, WA (US); Ellsworth D. Walker, Seattle, WA (US); Tim T. Chao, Redmond, WA (US); Michael G. Tricker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 11/675,243

(22) Filed: Feb. 15, 2007

(65) Prior Publication Data

US 2008/0120486 A1 May 22, 2008

Related U.S. Application Data

(60) Provisional application No. 60/866,821, filed on Nov. 21, 2006, provisional application No. 60/866,817, filed on Nov. 21, 2006, provisional application No. 60/866,815, filed on Nov. 21, 2006.

(51) Int. Cl.
*G06F 7/00* (2006.01)

(52) U.S. Cl.
USPC .......................................... 707/640; 714/6.32

(58) Field of Classification Search
USPC .................... 707/205, 640; 714/6.32
See application file for complete search history.

(56) References Cited

U.S. PATENT DOCUMENTS

| 5,345,590 | A | 9/1994 | Ault et al. |
|---|---|---|---|
| 5,491,788 | A | 2/1996 | Cepulis et al. |
| 5,689,701 | A | 11/1997 | Ault |
| 5,815,731 | A | 9/1998 | Doyle |
| 5,913,058 | A | 6/1999 | Bonola |
| 6,199,179 | B1 | 3/2001 | Kauffman |
| 6,226,734 | B1 | 5/2001 | Kleinsorge |
| 6,247,109 | B1 * | 6/2001 | Kleinsorge et al. .............. 712/13 |
| 6,421,679 | B1 | 7/2002 | Chang |
| 6,502,162 | B2 | 12/2002 | Blumenau |
| 6,546,415 | B1 | 4/2003 | Park |
| 6,574,748 | B1 | 6/2003 | Andress et al. |
| 6,598,174 | B1 * | 7/2003 | Parks et al. ................... 714/6.22 |
| 6,640,278 | B1 | 10/2003 | Nolan et al. |

(Continued)

OTHER PUBLICATIONS

Fletcher, M., and D.H. Norrie, "Realtime Reconfiguration Using an IEC 61499 Operating System," Proceedings of the 15th International Parallel & Distributed Processing Symposium, San Francisco, Calif., Apr. 23-27, 2001.

(Continued)

*Primary Examiner* — Jensen Hu
(74) *Attorney, Agent, or Firm* — Microsoft Corporation

(57) ABSTRACT

Apparatus and methods for replacing partition units are disclosed. Generic and platform-specific drivers based on a driver model that specify a plurality of callbacks are disclosed. The drivers enable the replacement of partition units without the firmware and/or software of a computing device having to be recompiled for each platform. The plurality of callbacks provide access to a plurality of functions that are safe to use when operating system services are not available. The plurality of callbacks include, but are not limited to, initialization, memory transfer, and transfer processor state callbacks. The methods use the drivers to replace partition units. Preferably, partition units are replaced using platform-specific partition unit replacement (PUR) drivers that take advantage of platform-specific capabilities.

20 Claims, 9 Drawing Sheets

U.S. PATENT DOCUMENTS

| | | | |
|---|---|---|---|
| 6,684,230 | B1 | 1/2004 | Momoh |
| 6,792,564 | B2 | 9/2004 | Ahrens, Jr. et al. |
| 6,895,586 | B1 | 5/2005 | Brasher |
| 6,907,474 | B2 | 6/2005 | Oshins |
| 6,986,014 | B2 | 1/2006 | Qureshi |
| 7,007,192 | B2 | 2/2006 | Yamazaki |
| 7,039,827 | B2* | 5/2006 | Meyer et al. .................. 714/4 |
| 7,051,243 | B2 | 5/2006 | Helgren |
| 7,065,761 | B2 | 6/2006 | Foster et al. |
| 7,114,064 | B2 | 9/2006 | Ramesh |
| 7,171,590 | B2 | 1/2007 | Kadoi |
| 7,275,180 | B2 | 9/2007 | Armstrong et al. |
| 7,343,515 | B1 | 3/2008 | Gilbertson et al. |
| 7,363,394 | B2 | 4/2008 | Shen et al. |
| 7,404,105 | B2 | 7/2008 | Arai |
| 7,426,657 | B2 | 9/2008 | Zorek, Sr. et al. |
| 7,480,911 | B2 | 1/2009 | Lee et al. |
| 7,493,515 | B2* | 2/2009 | Armstrong et al. ............ 714/10 |
| 7,509,375 | B2 | 3/2009 | Christian et al. |
| 7,543,182 | B2* | 6/2009 | Branda et al. ................. 714/15 |
| 7,562,262 | B2 | 7/2009 | Kondajeri et al. |
| 7,934,121 | B2 | 4/2011 | Ritz et al. |
| 8,086,906 | B2 | 12/2011 | Ritz et al. |
| 2002/0016892 | A1 | 2/2002 | Zalewski |
| 2002/0053009 | A1* | 5/2002 | Selkirk et al. ................ 711/162 |
| 2002/0144193 | A1 | 10/2002 | Hicks et al. |
| 2002/0170039 | A1* | 11/2002 | Kovacevic ................... 717/138 |
| 2003/0037278 | A1* | 2/2003 | Olarig ............................ 714/5 |
| 2003/0163744 | A1 | 8/2003 | Yamazaki |
| 2004/0107383 | A1 | 6/2004 | Bouchier et al. |
| 2004/0193950 | A1 | 9/2004 | Gagne et al. |
| 2004/0221193 | A1 | 11/2004 | Armstrong |
| 2005/0283641 | A1 | 12/2005 | Clark et al. |
| 2006/0010344 | A1 | 1/2006 | Zorek et al. |
| 2006/0095624 | A1 | 5/2006 | Raj et al. |
| 2007/0061634 | A1 | 3/2007 | Marisetty et al. |
| 2007/0067673 | A1 | 3/2007 | Avizienis |
| 2008/0010527 | A1 | 1/2008 | Lu |
| 2008/0028413 | A1 | 1/2008 | Conklin et al. |
| 2008/0120486 | A1 | 5/2008 | Ritz et al. |
| 2008/0120515 | A1 | 5/2008 | Ritz et al. |
| 2008/0120518 | A1 | 5/2008 | Ritz et al. |
| 2008/0201603 | A1 | 8/2008 | Ritz et al. |
| 2010/0262590 | A1 | 10/2010 | Holt |

OTHER PUBLICATIONS

Milojicic, D., et al., "Global Memory Management for a Multi Computer System," Proceedings of the 4th USENIX Windows Symposium, Seattle, Wash., Aug. 3-4, 2000.

Moore, R.W., "Knowledge-Based Grids," Proceedings of the 18th IEEE Symposium on Mass Storage Systems, Apr. 17-20, 2001, San Diego, Calif., 2000, pp. 29-39.

Written Opinion of the International Searching Authority from International Application PCT/US2007/085180, Apr. 21, 2008.

International Search Report from International Application PCT/US2007/085180, Apr. 21, 2008.

Written Opinion of the International Searching Authority from International Application PCT/US2007/085216, Apr. 22, 2008.

International Search Report from International Application PCT/US2007/085216, Apr. 22, 2008.

Written Opinion of the International Searching Authority from International Application PCT/US2007/085184, Mar. 28, 2008.

International Search Report from International Application PCT/US2007/085184, Mar. 28, 2008.

Non-Final Office Action cited in U.S. Appl. No. 11/675,261 dated Mar. 29, 2010, 17 pgs.

Reply to Non-Final Office Action cited in U.S. Appl. No. 11/675,261 dated Jun. 29, 2010, 14 pgs.

Final Office Action cited in U.S. Appl. No. 11/675,261 dated Oct. 5, 2010, 19 pgs.

Reply to Final Office Action cited in U.S. Appl. No. 11/675,261 dated Jan. 5, 2011, 17 pgs.

Non-Final Office Action cited in U.S. Appl. No. 11/675,261 dated Mar. 4, 2011, 19 pgs.

Reply to Non-Final Office Action cited in U.S. Appl. No. 11/675,261 dated May 16, 2011, 21 pgs.

Final Office Action cited in U.S. Appl. No. 11/675,261 dated Aug. 4, 2011, 13 pgs.

Reply to Final Office Action cited in U.S. Appl. No. 11/675,261 dated Aug. 11, 2011, 13 pgs.

Notice of Allowance cited in U.S. Appl. No. 11/675,261 dated Aug. 24, 2011, 19 pgs.

Non-Final Office Action cited in U.S. Appl. No. 11/675,272 dated Aug. 7, 2009, 19 pgs.

Reply to Non-Final Office Action cited in U.S. Appl. No. 11/675,272 dated Nov. 3, 2009, 17 pgs.

Final Office Action cited in U.S. Appl. No. 11/675,272 dated Mar. 18, 2010, 19 pgs.

Reply to Final Office Action cited in U.S. Appl. No. 11/675,272 dated Jun. 15, 2010, 10 pgs.

Notice of Allowance cited in U.S. Appl. No. 11/675,272 dated Sep. 21, 2010, 30 pgs.

Non-Final Office Action cited in U.S. Appl. No. 11/675,290 dated Jun. 24, 2009, 16 pgs.

Reply to Non-Final Office Action cited in U.S. Appl. No. 11/675,290 dated Oct. 26, 2009, 16 pgs.

Final Office Action cited in U.S. Appl. No. 11/675,290 dated Jan. 27, 2010, 10 pgs.

Reply to Final Office Action cited in U.S. Appl. No. 11/675,290 dated Apr. 27, 2010, 15 pgs.

Non-Final Office Action cited in U.S. Appl. No. 11/675,290 dated May 24, 2010, 15 pgs.

Reply to Non-Final Office Action cited in U.S. Appl. No. 11/675,290 dated Aug. 20, 2010, 16 pgs.

Final Office Action cited in U.S. Appl. No. 11/675,290 dated Oct. 4, 2010, 17 pgs.

Reply to Final Office Action cited in U.S. Appl. No. 11/675,290 dated Nov. 24, 2010, 15 pgs.

Advisory Action cited in U.S. Appl. No. 11/675,290 dated Dec. 7, 2010, 4 pgs.

Notice of Allowance cited in U.S. Appl. No. 11/675,290 dated Jan. 19, 2011, 13 pgs.

Non-Final Office Action cited in U.S. Appl. No. 13/044,391 dated Nov. 6, 2012, 30 pgs.

Non-Final Office Action cited in U.S. Appl. No. 13/289,776 dated Aug. 23, 2012, 22 pgs.

Reply to Non-Final Office Action cited in U.S. Appl. No. 13/289,776 dated Nov. 27, 2012, 20 pgs.

Final Office Action cited in U.S. Appl. No. 13/289,776 dated Dec. 6, 2012, 16 pgs.

Int. Preliminary Report on Patentability cited in PCT Application No. PCT/US2007/085184 dated May 26, 2009, 6 pgs.

First Chinese Office Action cited in Chinese Application No. 200780042958.5 dated Sep. 13, 2010, 7 pgs.

Chinese Office Action cited in Chinese Application No. 200780042958.5 dated Jun. 24, 2011, 10 pgs.

Second Chinese Office Action cited in Chinese Application No. 200780042958.5 dated Apr. 17, 2012, 6 pgs.

Int. Preliminary Report on Patentability cited in PCT Application No. PCT/US2007/085216 dated May 26, 2009, 8 pgs.

First Chinese Office Action cited in Chinese Application No. 200780042960.2 dated Nov. 4, 2010, 10 pgs.

Second Chinese Office Action cited in Chinese Application No. 200780042960.2 dated Nov. 30, 2011, 6 pgs.

Third Chinese Office Action cited in Chinese Application No. 200780042960.2 dated Mar. 22, 2012, 6 pgs.

EP Communication cited in EP Application No. 07864653.6 dated Dec. 6, 2011, 1 pg.

"Intel Hyper-Threading Technology", Technical User's Guide, Intel Corporation, Jan. 2003, 44 pgs.

"Detecting Multi-Core Processor Topology in an IA-32 Platform", Khang Nguyen and Shihjong Kuo, Intel Corporation, 2006, 17 pgs.

"The Unabridged Pentium 4 IA32 Processor Genealogy", Tom Shanley and Bob Colwell, Addison Wesley, Jul. 26, 2004, retrieved from Safari Tech Books Online, 8 pgs.

Reply first Chinese Office Action cited in Chinese Application No. 200780042958.5 dated Nov. 18, 2010, 13 pgs.

Reply to Chinese Office Action cited in Chinese Application No. 200780042958.5 dated Sep. 23, 2011, 14 pgs.
Reply to Chinese Office Action cited in Chinese Application No. 200780042958.5 dated Jun. 15, 2012, 12 pgs.
Chinese Notice of Allowance cited in Chinese Application No. 200780042958.5 dated Nov. 6, 2012, 4 pgs.
Reply to first Chinese Office Action cited in Chinese Application No. 200780042960.2 dated Dec. 10, 2010, 7 pgs.
Reply to second Chinese Office Action cited in Chinese Application No. 200780042960.2 dated Dec. 16, 2011, 8 pgs.
Reply to third Chinese Office Action cited in Chinese Application No. 200780042960.2 dated May 21, 2012, 8 pgs.
Chinese Notice of Allowance cited in Chinese Application No. 200780042960.2 date4d Jul. 26, 2012, 4 pgs.
Reply to EP Communication cited in EP Application No. 0786465.6 dated Jun. 15, 2012, 14 pgs.

* cited by examiner

DRIVER MODEL FOR REPLACING CORE SYSTEM HARDWARE

CROSS-REFERENCES TO RELATED APPLICATIONS

This application claims the benefit of U.S. Provisional Patent Applications "Transparent Replacement of System CPU" No. 60/866,821, filed Nov. 21, 2006; "Driver Model for Replacing Core System Hardware," No. 60/866,817, filed Nov. 21, 2006; and "Replacing System Hardware," No. 60/866,815, filed Nov. 21, 2006; and U.S. Nonprovisional patent applications "Replacing System Hardware," Ser. No. 11/675,272, filed concurrently herewith; "Transparent Replacement of a System CPU" Ser. No. 11/675,290, filed concurrently herewith; and "Correlating Hardware Devices Between Local Operating System and Global Management Entity," Ser. No. 11/675,261, filed concurrently herewith, the subject matter of which is also incorporated herein by reference.

BACKGROUND

A microprocessor is an electronic device capable of performing the processing and control functions for computing devices such as desktop computers, laptop computers, server computers, cell phones, laser printers, and so on. Typically, a microprocessor comprises a small plastic or ceramic package that contains and protects a small piece of semiconductor material that includes a complex integrated circuit. Leads connected to the integrated circuit are attached to pins that protrude from the package allowing the integrated circuit to be connected to other electronic devices and circuits. Microprocessors are usually plugged into or otherwise attached to a circuit board containing other electronic devices.

While a microprocessor integrated circuit typically includes only one computing unit, i.e., one processor, it is possible to include multiple processors in a microprocessor integrated circuit. The multiple processors, which are often referred to as "cores," are included in the same piece of semiconductor material and connected to the microprocessor package pins. Having multiple cores increases the computing capability of the microprocessor. For example, a microprocessor with four cores can provide almost the same amount of computing capability as four single core microprocessors.

There has been an increase in the use of multiple microprocessors and multiple-core microprocessors in traditional computing devices. Traditional computing devices are capable of running only one instance of an operating system. Even traditional computing devices that contain multiple core microprocessors, multiple microprocessors, or multiple multiple core microprocessors are only capable of running one instance of an operating system. Still, harnessing the increased computing capability that multiple core microprocessors provide allows computing functions, that were previously executed by multiple computing devices, to be executed with fewer computing devices.

For example, a server is a computing device connected to a network that provides a service or set of services to other entities connected to the network. A server comprising 32 traditional computing devices, i.e., a 32 way server, may be comprised of eight microprocessors, each having four cores. Taking the concept one step further, if each individual core is eight times more capable than one of the 32 computing devices, the 32-way server's capabilities can be provided by the four core microprocessor. A clear advantage of such a four core server is that computing resource redundancy is more affordable than that provided by traditional servers. In addition, reducing the number of microprocessors reduces the cost of the server, the amount of energy required to power the server, and the amount of maintenance the server requires.

It is possible to use "partitions" to take greater advantage of the computing capabilities of multiple core microprocessors A partition is an electrically isolatable set of electronic devices, e.g., processors, memory, etc., within a computing device that can run an independent instance of an operating system, i.e., a local operating system. A partitionable computing device is a computing device that can be divided into partitions and thus is able to run multiple local operating systems. A partitionable server is a server that is a partitionable computing device and thus able to run multiple local operating systems. A partition of a partitionable server may also be referred to as a "logical server." That is, to other entities on a network a logical server appears to be a stand-alone server, even though it is not. It also possible to assemble a plurality of servers, logical or otherwise, into a "server cluster." A server cluster is a plurality of servers that behave as a unit to provide a service or set of services.

The advantages of using multiple core microprocessors is driving a trend toward "server consolidation." Server consolidation is the process of replacing multiple servers, for example in a server cluster, with fewer servers, e.g., one server. A server that replaces multiple servers typically contains computing capability that equals or exceeds the capabilities of the multiple servers. While reducing costs, energy, and maintenance, server consolidation has the effect of putting all of one's eggs into one basket. Server consolidation may increase the impact of a server failure. For example, if multiple applications, which used to run on multiple servers, are all run on the same server, and that server fails, the impact is likely to affect all of the applications. In the worst case, this means application downtime. To guard against such an impact, many high end servers, i.e., servers with a large amount of computing capability, apply a portion of their capabilities to reliability features.

One such reliability feature is "failover" capability. Failover is the ability of a first entity to pass the information the first entity contains onto a second similar entity preferably before the first entity completely fails. Techniques have been developed for traditional servers, i.e., servers based on traditional computing devices, to perform failover in a controlled and orderly fashion to ensure that no data is lost and no ongoing processes are interrupted during the transition from the failing server to the replacement server.

In order to create multiple core microprocessor servers that are as robust and reliable as traditional servers, similar techniques that operate at the processor level are useful. Preferably, these techniques are able to run on a plurality of "platforms." A platform is a combination of hardware, firmware, and software that provides a framework on which higher level software operates and into which other hardware, firmware, and software may be added.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A driver model for replacing partition units in a computing device and drivers and methods of using drivers based on the driver model are disclosed. The driver model employs a plurality of callbacks for accessing a plurality of functions that are safe to use when operating system services are not available. The plurality of callbacks include, but are not limited to, initialization, memory transfer, and transfer processor state callbacks.

Using drivers allows a computing device to replace partition units without the computing device's service processor (SP) firmware and/or local operating system software having to be recompiled for particular platforms. Preferably, partition units are replaced using platform-specific partition unit replacement (PUR) drivers based on the driver model.

In one illustrative implementation, during initialization, a partition's local operating system: registers a PUR driver that may be generic or platform-specific; loads the PUR driver; executes an initialization callback; and receives context information, i.e., context, from the PUR driver. During a passive migration stage, the local operating system maps failed memory blocks and executes a memory transfer callback for each memory block. The PUR driver uses the computing device's platform-specific hardware, e.g., a service processor, to transfer memory, preferably in a manner that is optimized for the computing device's platform. During an active migration stage, the computing device is quiesced and the local operating system maps failed blocks and executes a memory transfer callback for each memory block and context. The SP uses the driver to transfer memory. The callback uses the SP to atomically remap memory blocks and the computing device is unquiesced. During a clean-up stage, the SP uses a removal callback to remove a failed partition unit and the local operating system removes the PUR driver.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
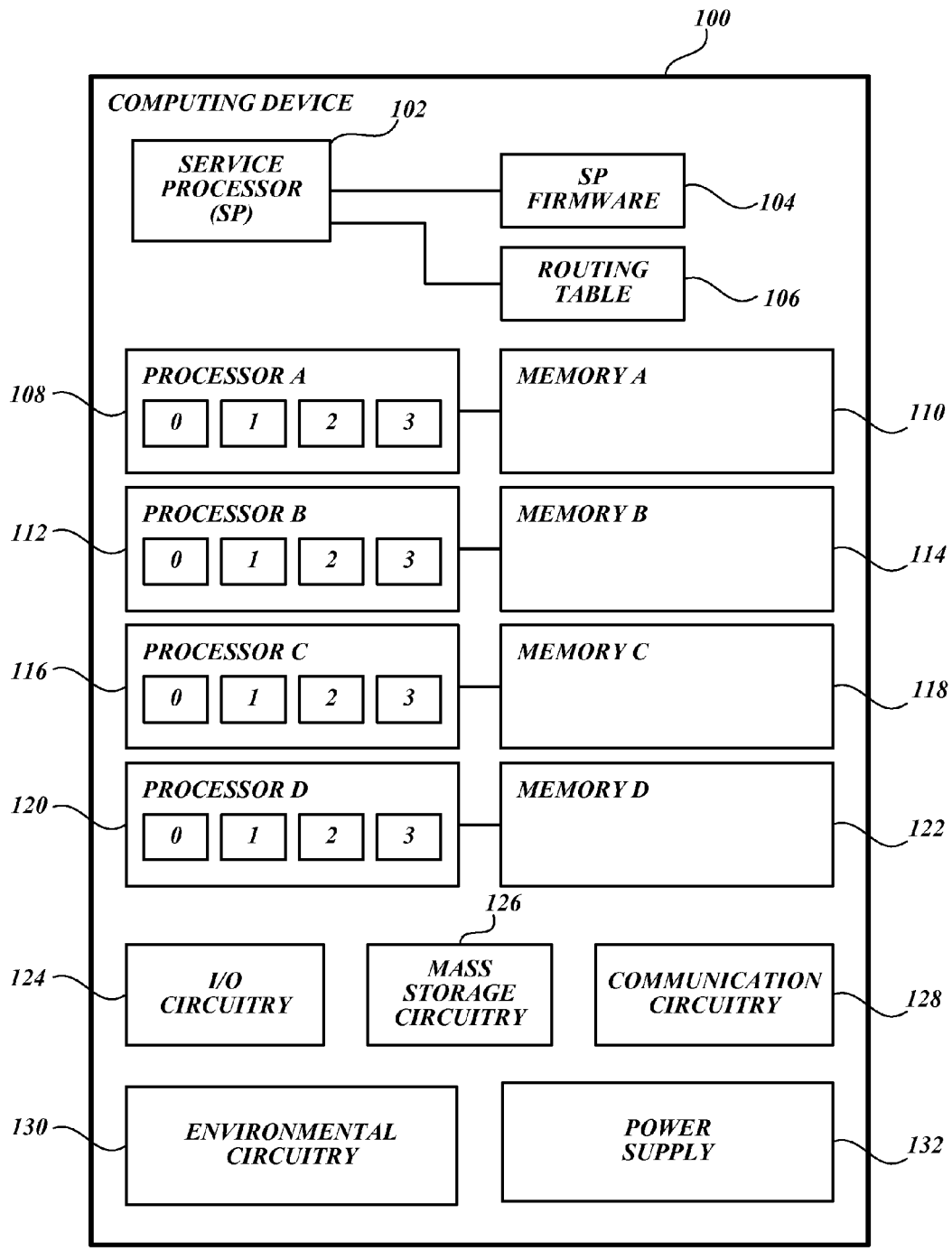
FIG. 1 is a block diagram of an exemplary computing device capable of supporting partition unit replacement.

A server is a computing device connected to a network that provides a service or set of services to other entities, e.g., computing devices, connected to the network. For example, a web page server provides a service that returns web pages in response to web page requests. Other exemplary servers are an email server that returns email messages for particular users, a video server that returns video clips from a video archive, etc. An exemplary server contains a microprocessor, a memory controller, and memory blocks controlled by the memory controller. The memory controller and the memory blocks controlled by the memory controller are often referred to as a unit, i.e., a memory unit.

Those skilled in the art will appreciate that a memory block is a contiguous segment of memory that may, for example, be specified by a starting address and a size. A memory block may be formed from one or more memory pages. Memory pages are segments of memory of a fixed size that are copied from main memory into mass storage, e.g., on a disc, and reloaded from mass storage back into main memory as needed. Copying the pages in a memory block to mass storage is called "paging out" memory. Reloading the pages in a memory block from mass storage back into main memory is called "paging in" memory. In general, transferring memory pages between main memory and mass storage is called "paging." The memory controller and the memory blocks controlled by the memory controller are often referred to as a unit, i.e., a memory unit.

Servers may also contain additional microprocessors, memory controllers, memory blocks, and other electronic devices such as interrupt processors. Hence, servers containing only a microprocessor and memory unit should be construed as exemplary and not limiting.

As with many types of computing devices, the operation of a server is controlled by a software program called an operating system. Traditional computing devices are capable of running only one instance of an operating system. Hence a traditional server, i.e., a server based on a traditional computing device or traditional computing devices, executes the instructions contained in a copy of the operating system, i.e., an instance of the operating system. For example, a server comprising 32 traditional computing devices, i.e., a 32 way server, may be comprised of eight microprocessors, each having four cores and yet run one operating system. Reducing the number of microprocessors reduces the cost of the server, the amount of energy required to power the server, and the amount of maintenance the server requires.

Partitions make it possible to take even greater advantage of the computing capabilities of multiple-core microprocessors A partition is an electrically isolatable set of electronic devices, e.g., processors, memory, etc., within a computing device that can run an independent instance of an operating system, i.e., a local operating system. A partitionable computing device is a computing device that can be divided into partitions and thus is able to run multiple local operating systems. A partitionable server is a server that is a partitionable computing device and thus able to run multiple local operating systems. A partition of a partitionable server may also be referred to as a "logical server." Hence, one partitionable server may contain multiple logical servers. A plurality of servers, logical or otherwise, may be assembled into a "server cluster" that behaves as a unit to provide a service or set of services.

Preferably, partitioning is dynamic. That is, partition units are assigned to, or removed from, partitions with little or no impact on the services the server provides. A server that is capable of being partitioned is a partitionable server. A server system, i.e., system, comprising partitionable servers is a partitionable system. A partitionable system provides flexibility in the number and configuration of partition units and electronic devices assigned to a partition and makes it easier and more cost-effective to support "server consolidation."

Server consolidation is the process of replacing multiple servers with fewer servers or perhaps even only one server. An exemplary server that is the result of a server consolidation typically contains computing capability that equals or exceeds the capabilities of the multiple servers that the server replaces. Server consolidation may increase the impact of a server failure. For example, imagine multiple applications that used to run on the multiple servers are all run on the one server. If the server fails, the impact is likely to affect all of the applications and even cause application downtime.

Traditional servers guard against such an impact by applying a portion of the servers' computing capability to reliability features such as "failover" capability. Techniques have been developed for traditional servers to perform failover in a controlled and orderly fashion to ensure that no data is lost and no ongoing processes are interrupted during the transition from the failing server to the replacement server. Since traditional servers connect to each other through a network and are thus not tightly tied together, work is broken into small pieces and shared across the servers, i.e., packetized. This makes it easy to replace a failing server since the failing server's work packets can be re-routed during failover. Notice that in order to implement failover, there must be more than one traditional server available. That is, a failing traditional server needs another similar traditional server able to accept data from the failing traditional server.

Since a partitionable server may contain multiple logical servers, which can communicate more easily than traditional servers tied together by a network, a partitionable server has the potential to provide reliability more easily and cost-effectively than a group of traditional servers. Processes for controlled and orderly failover that operate using the partitions in a partitionable server help realize the reliability partitionable servers can provide.

It is impractical to make partitionable servers more reliable by notifying each of the high-level software applications when a failover is required. To enable high-level software applications to respond to such a notification would require that the computer code for each application be modified to adapt to the failover. Even notifying applications would probably not be enough to provide failover without a mechanism to replace a portion of a running server. Instead, it is more practical and advantageous to involve only the lowest level software in the failover and allow the upper level software, e.g., applications, to behave as though no hardware change has happened.

An implementation of an orderly, low-level, partitionable server failover involves a global management entity and one or more local operating systems. Examples of a global management entity are a service processor (SP) and a baseboard management controller (BMC). An SP is a specialized microprocessor or microcontroller that manages electronic devices attached to a circuit board or motherboard, such as memory controllers and microprocessors. A BMC is also a specialized microcontroller embedded on a motherboard. In addition to managing electronic devices, a BMC monitors the input from sensors built into a computing system to report on and/or respond to parameters such as temperature, cooling fan speeds, power mode, operating system status, etc. Other electronic devices may fulfill the role of a global management entity. Hence, the use of an SP or BMC as a global management entity should be construed as exemplary and not limiting.

A local operating system is an instance of an operating system that runs on one partition. Partition units are assigned to a specific partition to ensure that the devices in the partition unit cannot be shared with devices in other partitions, ensuring that a failure will be isolated to a single partition. Such a partition unit may indicate which physical addresses are serviced by a given memory controller and, thereby, map the physical memory addresses to the memory controller and to the physical partition unit containing the memory controller. More than one partition unit may be required to boot and operate a partition. Unused or failing partition units may be electrically isolated. Electrically isolating partition units is similar to removing a server from a group of traditional servers with the advantage that partition units may be dynamically reassigned to different partitions.

In the foregoing discussion, unless otherwise noted, a partition unit comprises a single core and a single memory unit. However, partition units may comprise more than one core, memory unit, interrupt processor, and/or other devices that provide computing services and/or support. Hence, the use of partition units comprising a core and a memory controller should be construed as exemplary and not limiting. Managing, e.g., adding or replacing, the partition units in a partitionable server allows a failover to be performed in a controlled and orderly fashion to ensure that the partitionable server is as robust and reliable as traditional servers.

An exemplary computing device for implementing a partitionable server capable of supporting partitions and partition unit addition and/or replacement is illustrated by the block diagram shown in FIG. 1. The exemplary computing device 100 shown in FIG. 1 comprises a service processor (SP) 102 that is connected to a memory that stores SP firmware 104 and a routing table 106. Preferably, the SP firmware 104 is operating system independent. Hence, the SP firmware 104 is not an operating system but rather a library of operating system independent system management applications. Typically, the system management applications provide commands and command sets, command-line interfaces, graphical interfaces which may be web-based, and/or network management protocol interfaces, and so on. The computing device 100 also comprises processor A 108 connected to memory block A 110, processor B 112 connected to memory block B 114, processor C 116 connected to memory block C 118, and processor D 120 connected to memory block D 122. Each of the processors 108, 112, 116, and 120 contains four cores designated 0, 1, 2, and 3. The SP 102, which is controlled by the SP firmware 104, uses routing table 106 to manage the processors 108, 112, 126, 120 and memory blocks 110, 114, 118, and 122. Computing device 100 also comprises I/O (input/output) circuitry 124, mass storage circuitry 126, communication circuitry 128, environmental circuitry 130, and a power supply 132. The computing device 100 uses the I/O circuitry 124 to communicate with I/O devices. The computing device 100 uses the mass storage circuitry 126 to interact with internally and externally connected mass storage devices. The computing device 100 uses the communication circuitry 128 to communicate with external devices, usually over networks. The computing device 100 uses the environmental circuitry 130 to control environmental devices such as cooling fans, heat sensors, humidity sensors, etc. The power supply 132 powers the computing device 100. If, for example, SP 102 is replaced by a BMC, the BMC may communicate with and control the environmental circuitry 130 and the power supply 132 more precisely.

A computing device such as the exemplary computing device 100 illustrated in FIG. 1 and described above supports the replacement of partition units. The replacement of partition units may be understood by comparing the block diagram shown in FIG. 2 to the block diagram shown in FIG. 3. Both of the block diagrams shown in FIG. 2 and FIG. 3 includes the same four partition units. Each of the partition units comprises a processor and a memory block: processor A 202, connected to memory block 204; processor B 206, connected to memory block 208; processor C 210, connected to memory block 212; and processor D 214, connected to memory block 216. While the block diagrams in both FIG. 2 and FIG. 3 illustrate the same four partition units, the partition 200*a* shown in FIG. 2 comprises a different set of partition units when compared to the partition 200*b* shown in FIG. 3.

Figure 2:
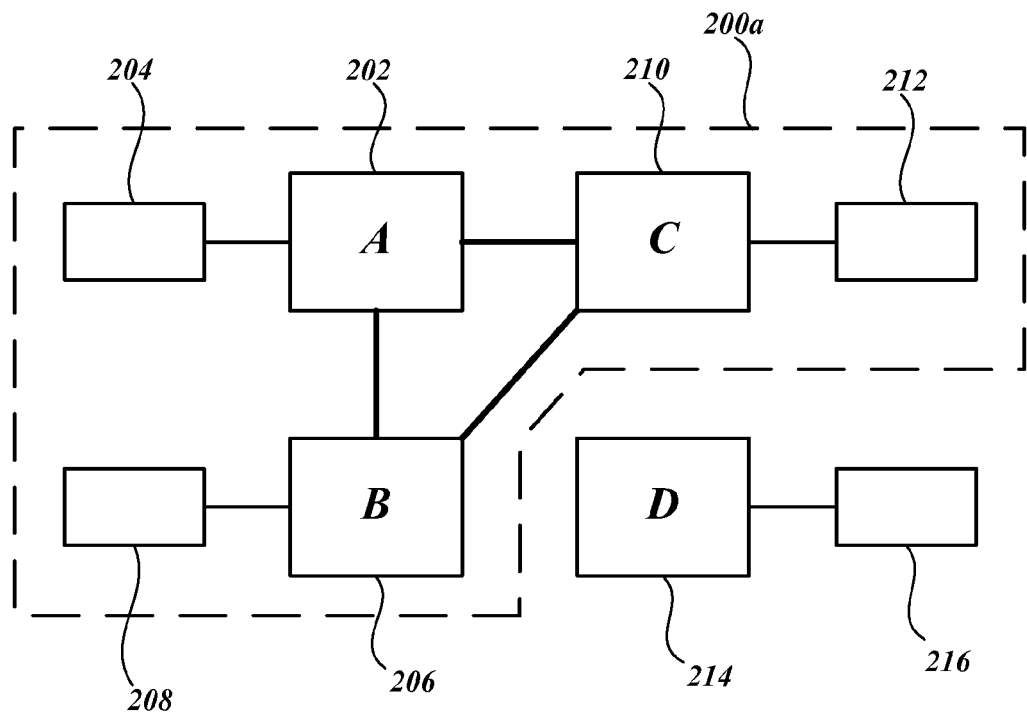
FIG. 2 is a block diagram of an exemplary partition containing a plurality of partition units and one partition unit which is unassociated.
Figure 3:
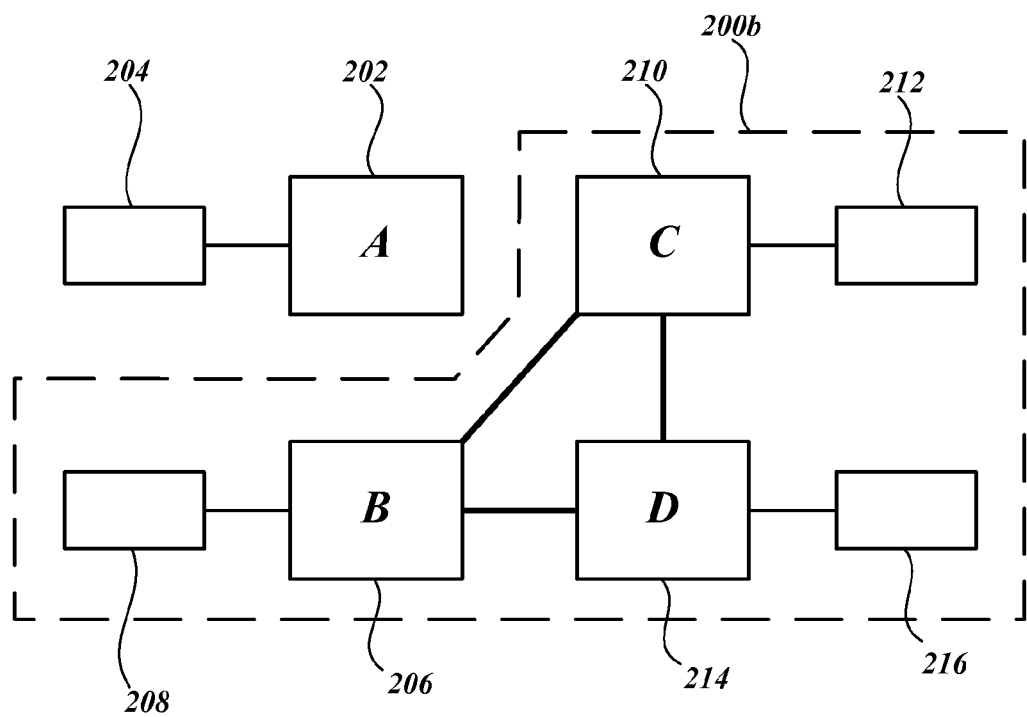
FIG. 3 is a block diagram of the exemplary partition illustrated in FIG. 2 reconfigured to include the previously unassociated partition unit.

The partition 200a illustrated in FIG. 2 comprises: processor A 202 and memory block 204; processor B 206 and memory block 208; and processor C 210 and memory block 212. In FIG. 2 the partition unit comprising processor D 214 and memory block 216 is not included in partition 200a. In contrast to the partition 200a shown in FIG. 2, the partition 200b shown in FIG. 3 has been changed to comprise a different set of partition units, i.e., a different set of processors and memory blocks. The partition 200b shown in FIG. 3 comprises: processor B 206 and memory block 208; processor C 210 and memory block 212; and processor D 214 and memory block 216. In FIG. 3, the partition unit comprising processor A 202 and memory block 204 is not included in the partition 200b whereas the partition unit comprising processor D 214 and memory block 216 is included in partition 200a shown in FIG. 2. In effect, the partition unit comprising processor D 214 and memory block 216 replaces the partition unit comprising processor A 202 and memory block 204. Such a replacement would be desirable if, for example, processor A 202 and/or memory block 204 were failing.

Figure 4:
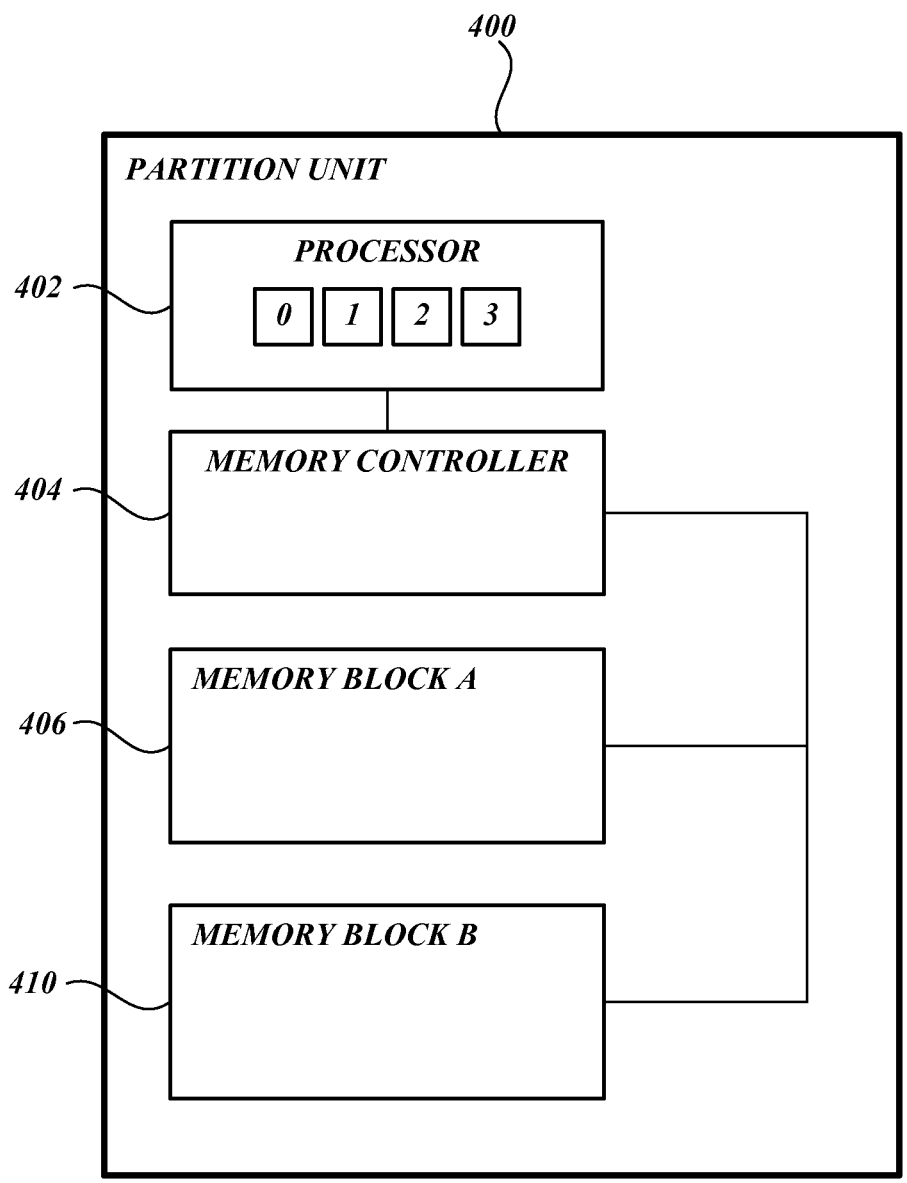
FIG. 4 is a block diagram of an exemplary partition unit.

While a single processor and a single memory block, such as processor A 202 and memory block 204, may comprise a partition unit, a partition unit may have other forms. A detailed view of an exemplary partition unit having a different form is illustrated in FIG. 4. In FIG. 4, as in FIG. 1, the exemplary partition unit 400 comprises a processor 402 containing four cores: 0, 1, 2, and 3 connected to a memory controller 404 that is connected to two memory blocks—memory block A 406 and memory block B 410. The processor 402 communicates with the memory controller 404, which controls memory block A 406 and memory block B 410. Other partition units may contain other logical devices that represent physical devices in addition to a processor, memory controller, and memory blocks or may contain only a single processor or a single memory controller. Hence, the partition unit 400 should be construed as exemplary and not limiting.

A logical device in a typical partition unit may be capable of notifying the local operating system of the device's status. Alternatively, or in addition, the local operating system controlling the partition unit may use predictive analysis to assess the status of the logical device and determine if the logical device might be failing and thus, may be a candidate for replacement. While a person, such as a system administrator, might check device status as a part of regular maintenance, it is preferable to have the hardware itself notify the local operating system of an impending failure. In some situations, it may be desirable to upgrade a processor from one model to another model or to add processors and/or memory to a system. While a system administrator may perform such functions, it is preferable to automate such replacements and additions by using explicitly programmed instructions or by periodically timed instructions that make use of partitions, partition units, and the ability of hardware to report status.

A partition unit, such as the partition unit 400 illustrated in FIG. 4, may fail for various reasons. For example, a partition unit may fail because a processor, such as the processor 402 shown in FIG. 4, fails. A partition unit may also fail because a memory block, such the memory block A 406 shown in FIG. 4, fails. When a processor, memory block, or other item in a partition unit fails, it is desirable to replace the failed item. While the foregoing discussion focuses on detecting and replacing failed memory blocks, the techniques described herein may be applied to detecting and replacing other failed items in a partition unit. Hence, the detection and replacement of failed memory blocks should be construed as exemplary and not limiting.

Figure 5:
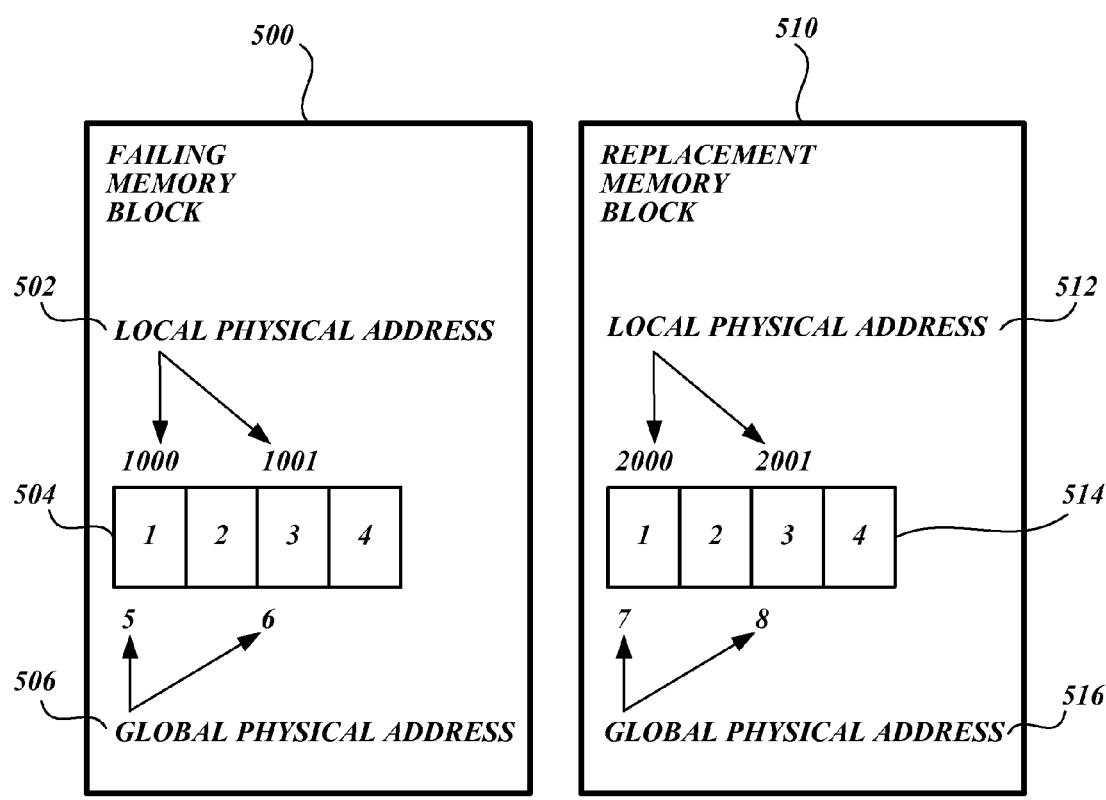
FIG. 5 is a block diagram of an exemplary failing memory block and an exemplary replacement memory block.

If a memory block fails, it is preferable to replace the memory block with an equivalent memory block. An exemplary failing memory block and an equivalent exemplary replacement memory block are illustrated in FIG. 5. In FIG. 5, a failing memory block 500 comprises a set of memory cells 504 containing data, for example, the numbers 1, 2, 3, and 4. The memory cells in the set of memory cells 504 may be referenced using a local physical address 502 and may also be referenced using a global physical address 506. The local physical address 502 uses addresses 1000 and 1001 whereas the global physical address 506 uses addresses 5 and 6. The failing memory block 500 may be replaced by a replacement memory block 510. The replacement memory block 510 comprises a set of memory cells 514 able to contain the data from the failing memory block 500, i.e., the numbers 1, 2, 3, and 4. As with the failing memory block, the memory cells in the set of memory cells 514 in the replacement memory block 514 may be referenced using a local physical address 512 and may also be referenced using a global physical address 516. The local physical address 512 uses addresses 2000 and 2001 whereas the global physical address 516 uses addresses 7 and 8. In a typical replacement sequence, the data in the set of memory cells 504 of the failing memory block 500 are copied into the set of memory cells 514 of the replacement memory block 510. The local physical address 502 of the failing memory block 500, i.e., 1000 and 1001, is remapped to the local physical address 512 of the replacement memory block 510. When replacing partition units, it is preferable to perform "atomic" updates, i.e., replacements, of memory blocks. During an atomic update of a memory block, if the memory block being updated is accessed, either the addresses of the failing memory block are exclusively used or the addresses of the replacement memory block are exclusively used. That is, the data accesses for memory cells 504 are made exclusively from local physical address 502 or exclusively from local physical address 512.

Preferably, a global management entity enables a local operating system to atomically replace memory blocks in a partition unit's memory unit. An "OS" driver, i.e., a driver available in the local operating system, may be used to provide a certain level of support for partition unit replacement. For certain memory replacement functions, the global management entity is able to use the firmware and the OS driver. As will be described in detail below, there are times during the memory replacement process in which the firmware and the OS driver are unable to run. Hence, during such times the global management entity cannot rely on the OS driver to perform certain functions needed for replacing memory blocks. In order to perform the memory replacement functions that cannot be performed by the firmware and the OS driver, a driver designed to run during such times is required. In addition, it is likely that an OS driver is unable to perform every function required during the memory replacement process. For example, the final swap of target memory for spare memory, at which time the spare partition unit assumes the physical addresses of the target partition unit, is a platform-specific operation. The final swap is a hardware configuration performed outside the domain of the local operating system and thus, cannot be performed by the OS driver.

Since the global management entity and the local operating system each have their own memory spaces, a way to convey data, i.e., a data conduit, between the global management entity and the local operating system is needed. A specially designed driver can provide a data conduit between the local operating system and the global management entity enabling the driver to operate throughout the memory replacement process and thus support Partition Unit Replacement (PUR).

An example of such a driver is a PUR driver. Preferably, a PUR driver is based on a PUR driver model in order to abstract away the details of the memory replacement functions. Those skilled in the art will appreciate that using drivers based on a driver model enables the replacement software and/or firmware, i.e., the software and/or firmware used to perform replacements, to run correctly on equipment from a plurality of vendors without modifying the software and/or firmware used to perform replacements. Hence, to support the replacement of failing partition units, e.g., memory, it is preferable to use a driver model to abstract away the details of replacing a failing partition unit with a spare partition unit.

A generic PUR driver, i.e., a PUR driver that operates across a plurality of platforms, may provide adequate performance. Using platform-specific PUR drivers, i.e., PUR drivers written specifically for particular hardware platforms, the PUR driver model enables the replacement software and/or firmware to run more efficiently and effectively on each particular hardware platform. For example, a memory transfer that uses a generic PUR driver is likely to be performed by copying memory blocks using a byte by byte copying technique. A memory transfer that uses a platform-specific PUR driver may be performed by using direct memory access (DMA) techniques, or other platform-specific techniques, which are usually much faster and more efficient than byte by byte copying techniques.

An exemplary PUR driver model includes specifications of a set of callback routines. A PUR driver implementing the PUR driver model implements each of the callback routines in a way that is compatible with the platform for which the PUR driver is written. Such implementation allows the PUR driver to be plugged into the firmware and/or software implementing a partition unit replacement process. The firmware and/or software then uses the callback routines to optimally execute the functions invoked by the callbacks. The firmware and/or software, through a callback, passes a "context" to the local operating system. A context is a data structure that contains information, i.e., context information, for a specific replacement instance. The local operating system does not itself use the context. Instead, the local operating system may, in other callbacks, pass the context back to the firmware and/or driver. In this way, the firmware and/or software and driver are able to determine which specific replacement instance is being performed. Such a context is more of a convenience if only one replacement operation is executing but becomes more necessary if there is more than one replacement operation executing at the same time.

Using drivers based on a driver model provides a way to avoid customizing the firmware for each operating system. As will be appreciated by those skilled in the art, a driver model defines the names, inputs, and outputs and perhaps other data of the callbacks. Drivers for each platform implement the callbacks, preferably in ways that take advantage of each the platform's capabilities. For example, a exemplary platform may have special memory transfer capabilities that accelerate the process of copying memory from one block to another. In a driver written for the platform, a callback involving copying memory from one memory block to a different memory block may be implemented such that the platform's accelerated memory transfer capabilities are used.

Figure 6A:
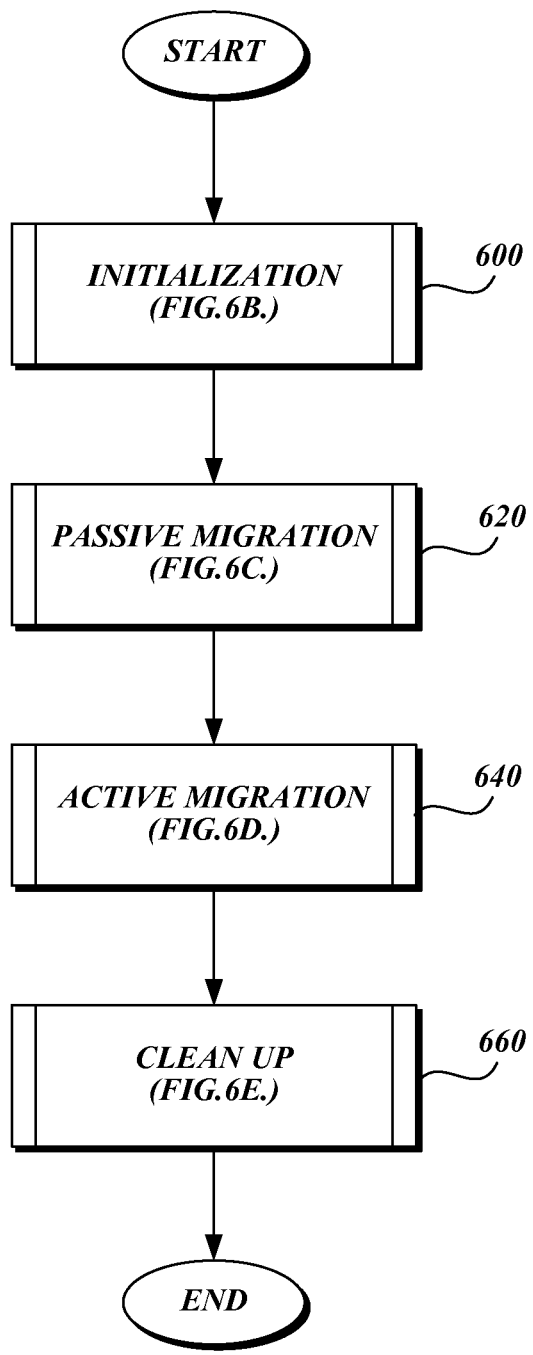
FIG. 6A-E comprises a functional flow diagram of an exemplary process for using a driver based on a driver model to replace a partition unit.

FIG. 6A is a functional flow diagram that provides a top level view of an exemplary process for using a driver based on a driver model to replace a partition unit. The process comprises four subroutines. The process begins at the first subroutine 600, initialization. The callback mechanism is able to operate when most local operating system services are not available because, during initialization, the driver receives a series of functions that are "safe" to use when most local operating system services are not available. A safe function executes without disturbing the replacement process by, for example, triggering interrupts. A local operating system may, for example, allocate memory using paging which involves accessing a disc drive and triggering interrupts. Hence, a safe function must be provided that allocates memory in a non-paged way, i.e., without paging to a disc drive.

The next two subroutines in the process involve passive and active migration of the replacement memory. The purpose of both passive and active migration is to transfer as much information from the failing partition unit to the replacement partition unit as possible without shutting down or significantly disturbing ongoing high level applications. For example, typically a plurality of memory blocks is allocated to an application. When an application modifies a memory block, a flag is set to indicate that the memory block has been modified. If a memory block has not been modified, the flag for the memory block remains unset. Often, not all of the allocated memory blocks are modified by the application. As long as a memory block is not modified, the contents of the memory block may be passively upgraded to a replacement memory block without disrupting the application.

Continuing with FIG. 6A, after initialization is complete, control flows to subroutine 620, passive migration. After passive migration is complete, control flows to subroutine 640, active migration. After active migration is complete, control flows to subroutine 660, cleanup. After cleanup completes, the process ends.

Figure 6B:
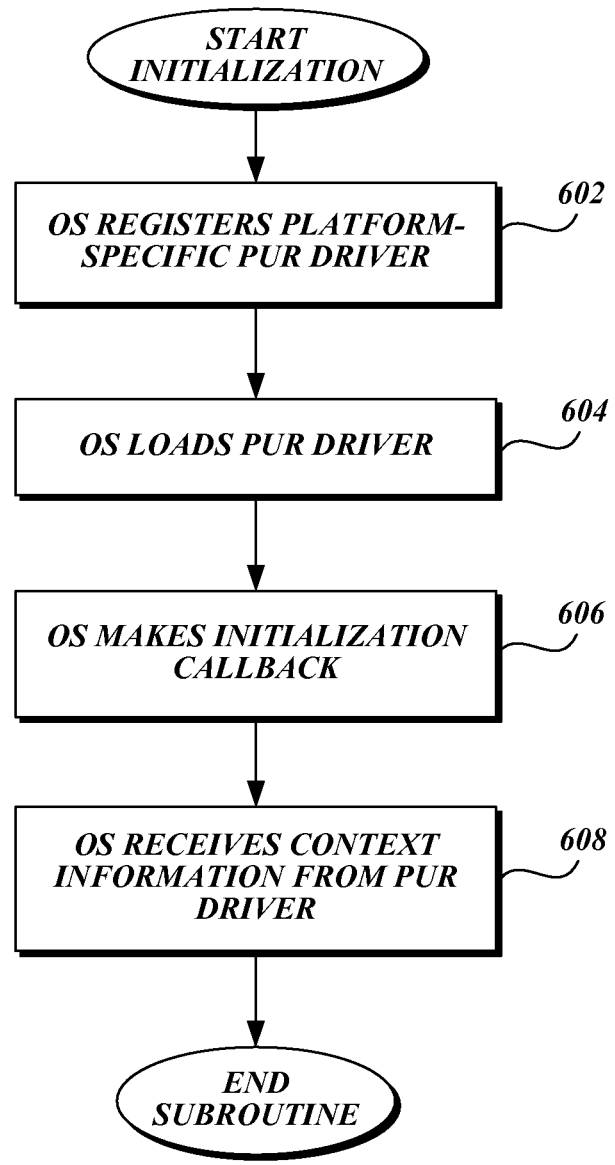

FIG. 6B is a functional flow diagram of an exemplary subroutine suitable for use as the initialization subroutine 600 shown in FIG. 6A. The subroutine begins at block 602 in which the local operating system, i.e., OS, registers a platform-specific partition unit replacement driver (PUR driver). At block 604 the OS loads the PUR driver. At block 606 the OS makes an initialization callback. At block 608 the OS receives context information from the PUR driver. After block 608, the subroutine ends.

Figure 6C:
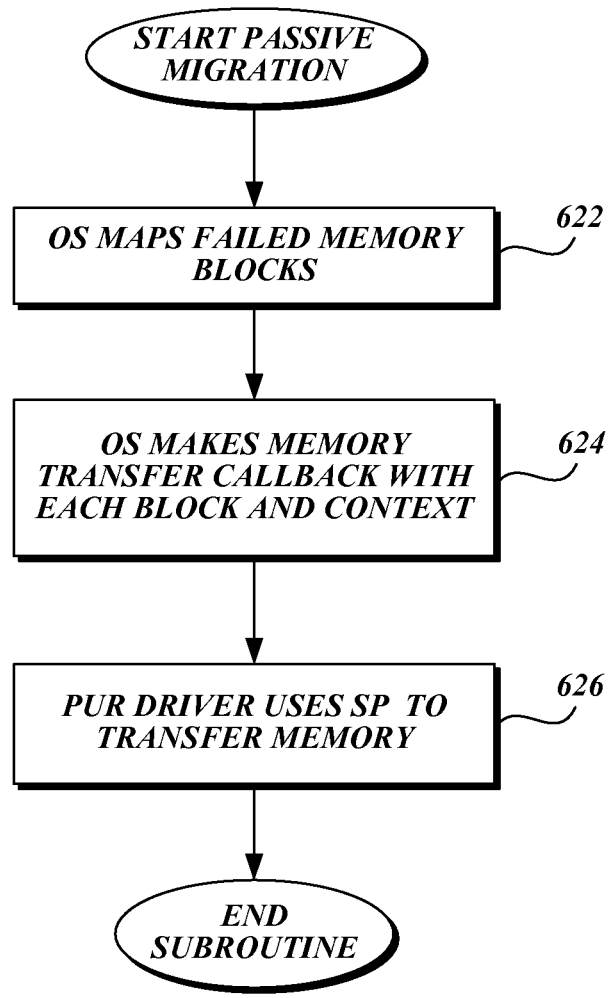

FIG. 6C is a functional flow diagram of an exemplary subroutine suitable for use as the passive migration subroutine 620 shown in FIG. 6A. The subroutine begins at block 622 in which the local operating system, i.e., OS, maps failed memory blocks. Those skilled in the art and others will appreciate that mapping failed memory blocks is a process whereby failed memory blocks are identified by marking the locations of the failed memory blocks in a map of the OS's memory blocks. As described above, a memory block may be formed from one or more memory pages. Mapping failed memory blocks may also be accomplished by mapping the memory pages that form the failed memory blocks. Hence, mapping failed memory blocks should be construed as exemplary and not limiting. At block 624 the OS makes a memory transfer callback with each block and context. During passive migration, only memory blocks that have not been modified, i.e., memory blocks whose modify flags have not been set, are transferred. The memory transfer may be accomplished by paging the memory pages that form the memory blocks. At block 626, the PUR driver uses the SP to transfer memory. After block 626, the subroutine ends. It is also possible for the PUR driver to use other global system hardware, e.g., a DMA engine, to transfer memory. Hence, the use of an SP by the PUR driver should be construed as exemplary and not limiting.

Figure 6D:
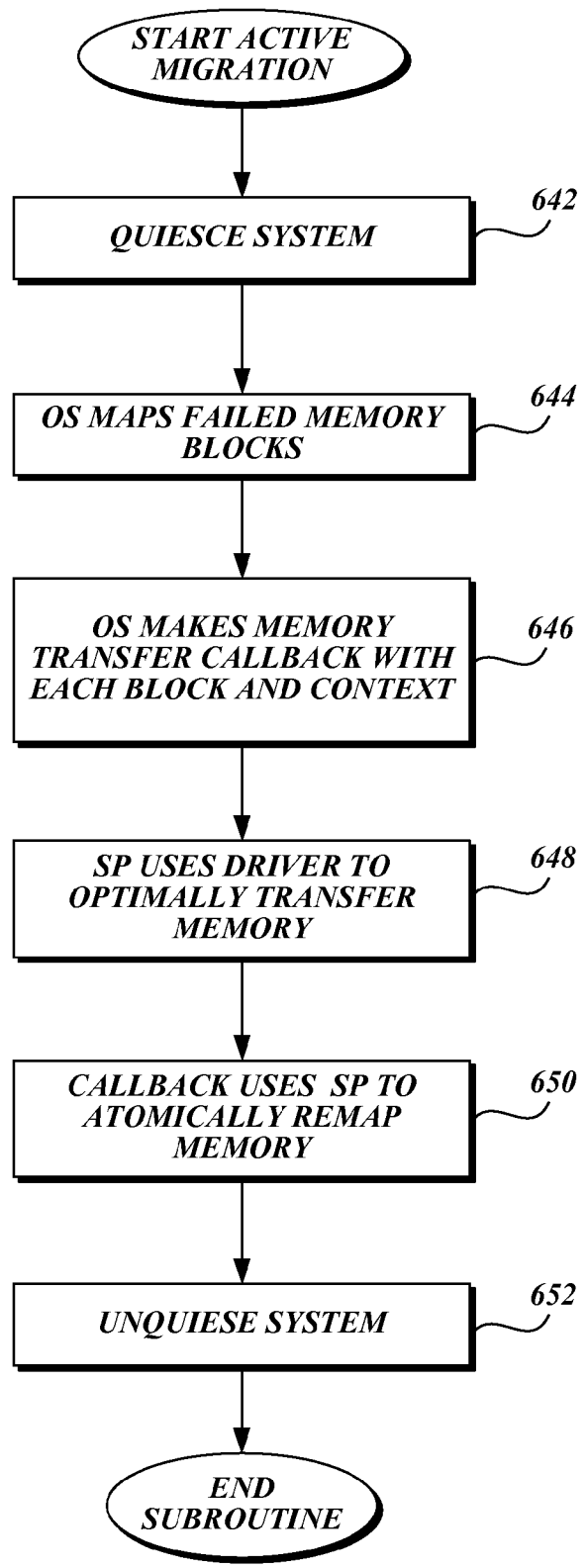

FIG. 6D is a functional flow diagram of an exemplary subroutine suitable for use as the active migration subroutine 640 shown in FIG. 6A. The subroutine begins at block 642 in which the system, e.g., the local operating system, is quiesced. The term "quiesce" means to place the system in a state of relative inactivity. When a system is quiesced, interrupts are stopped to keep I/O devices and other processors from triggering interrupts and to prevent memory modification. Preferably, the local operating system selects a controlling processor, i.e., the processor that will control the quiescing activities. The controlling processor executes a set of instructions that accomplish system quiescing and active migration. There are various algorithms for choosing a controlling processor. For example, the least busy processor with the lowest number that is not being replaced may be selected to be the controlling processor. Quiescing a system provides a safe environment for atomic replacements.

Continuing with FIG. 6D, at block 644 the OS maps failed blocks. At block 646 the OS makes a memory transfer callback with each block and context. At block 648, the SP uses the PUR driver to transfer memory. Recall that, as described above, during passive migration only memory blocks that have not been modified, i.e., memory blocks whose modify flags have not been set, are transferred. During active migration, the memory blocks that are transferred are the remaining memory blocks, i.e., the memory blocks whose modify flags have been set. Preferably, the memory transfers performed during both passive and active migration use the platform-specific memory transfer capabilities that accelerate the process of copying memory. At block 650 a callback uses the SP to atomically remap memory. The remapping of memory performed at block 650 causes the memory in the spare partition unit to respond to the same local operating system physical addresses as the memory in the original partition unit once responded. In effect, a "swap" is performed in that the spare partition unit takes the place of the original partition unit from the point of view of the local operating system. Such a swap may be performed with processors as well.

Continuing in FIG. 6D, at block 652 the system is unquiesced. Unquiescing a system is basically the inverse of quiescing a system. That is, the system is brought back to a state of normal activity in a controlled fashion and roughly in the reverse order of the quiescing process. After block 652, the subroutine ends.

Figure 6E:
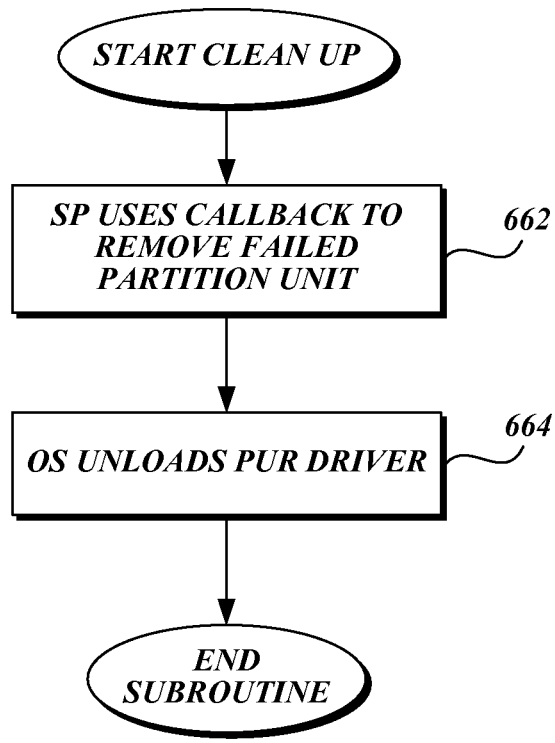

FIG. 6E is a functional flow diagram of an exemplary subroutine suitable for use as the cleanup subroutine 660 shown in FIG. 6A. The subroutine begins at block 662 in which the SP uses a callback to remove the failed partition unit, i.e., the partition unit containing the failed memory unit. At block 664 the OS unloads the PUR driver. After block 664, the subroutine ends concluding the exemplary process illustrated in FIG. 6A.

While the driver model described above and the process for using the driver model, illustrated in FIGS. 6A-E and also described above, is directed to replacing memory blocks, i.e., blocks, it is also possible to have callbacks in a drive model that enable processor state transfer or state transfer for other kinds of devices, e.g., interrupt controllers. For example, a callback for processors may be needed if the physical APIC ID of a failing processor needs to be manipulated. Also, while the exemplary driver model described above is only concerned with memory replacement, a driver model may also aid in the addition of memory to a partition.

While illustrative embodiments have been illustrated and described, it will be appreciated that various changes can be made therein without departing from the spirit and scope of the invention. For example, while illustrative embodiments illustrated and described above are directed to detecting and replacing failing memory blocks, similar techniques may be applied to detecting and replacing other types of failing items in a failing partition unit.

The embodiments of the invention in which an exclusive property or privilege is claimed are are defined as follows:

1. A computer-implemented method for replacing a partition unit, the method comprising:
   identifying a partition unit among a plurality of partition units assigned to a logical partition as a partition unit to be replaced;
   initializing a partition unit replacement (PUR) driver for use by a local operating system to replace the partition unit to be replaced with a replacement partition unit, the PUR driver providing a data conduit between the local operating system and global system hardware;
   employing the PUR driver to use the global system hardware to transfer data from the partition unit to be replaced to the replacement partition unit, the PUR driver comprising a memory transfer callback that, when called by the local operating system, instructs the transfer of the data by the global system hardware, the transfer of the data comprising an active migration, the active migration comprising:
      quiescing the local operating system by mitigating interrupts and memory modification; and
      transferring, with the global system hardware while the local operating system is quiesced, data from modified memory blocks in the partition unit to be replaced to the replacement partition unit; and
   remapping the replacement partition unit to respond to physical addresses from the local operating system in a substantially same way as the partition unit to be replaced previously responded.

2. The method of claim 1, the PUR driver comprising a platform-specific driver.

3. The method of claim 1, the transfer of the data comprising a passive migration, the passive migration comprising transferring, with the global system hardware, data from unmodified memory blocks in the partition unit to be replaced to the replacement partition unit.

4. The method of claim 3, the passive migration comprising:
   mapping the unmodified memory blocks in the partition unit to be replaced to blocks of memory in the replacement partition unit; and
   executing a memory transfer callback with the PUR driver to the global system hardware for respective unmodified memory blocks as respective unmodified memory blocks are mapped.

5. The method of claim 1, the global system hardware comprising a service processor.

6. The method of claim 1, the partition unit to be replaced comprising a plurality of memory blocks, respective memory blocks of the plurality of memory blocks associated with a modify flag, a modified memory blockof the plurality of memory blocks identified by a modify flag that is set.

7. The method of claim 5, the global system hardware comprising operating system independent firmware.

8. The method of claim 1, the global system hardware comprising operating system independent firmware.

9. The method of claim 1, the local operating system executed on at least one processor of the logical partition.

10. A computer-readable memory, comprising computer-executable instructions that, when executed by one or more processors, perform a method of replacing a partition unit, the method comprising:
   identifying a partition unit among a plurality of partition units assigned to a logical partition as a partition unit to be replaced;

initializing a partition unit replacement (PUR) driver to replace the identified partition unit with a replacement partition unit, the PUR driver providing a data conduit between a local operating system and global system hardware;

employing the PUR driver to use the global system hardware to transfer data from the partition unit to be replaced to the replacement partition unit, the PUR driver comprising a memory transfer callback that instructs the transfer of the data by the global system hardware, the transfer of the data comprising an active migration, the active migration comprising:
quiescing the local operating system; and
transferring, with the global system hardware while the local operating system is quiesced, data from modified memory blocks in the partition unit to be replaced to the replacement partition unit; and remapping the replacement partition unit to respond to physical addresses from the local operating system in a substantially same way as the partition unit to be replaced previously responded.

11. The computer-readable memory of claim 10, the transfer of the data comprising a passive migration, the passive migration comprising transferring, with the global system hardware, data from unmodified memory blocks in the partition unit to be replaced to the replacement partition unit.

12. The computer-readable memory of claim 10, respective memory blocks associated with a modify flag, a modified memory block identified by a modify flag that is set and an unmodified memory block identified by a modify flag that is not set.

13. The computer-readable memory of claim 10, the employing the PUR driver comprising passing a context through a callback from the local operating system, the context identifying a specific replacement instance being performed.

14. A computing device, comprising:
a plurality of partitions, a first partition of the plurality of partitions comprising at least one processor and a memory unit, the first partition executing a local operating system (OS) and the memory unit comprising a plurality of memory blocks;
an available memory unit to replace the memory unit of the first partition when a determination is made that the memory unit of the first partition is to be replaced;
global system hardware for transferring data from the memory unit to be replaced to the available memory unit,
the global system hardware configured to passively migrate data from unmodified memory blocks in the memory unit to be replaced to the available memory unit, and
the global system hardware configured to actively migrate data from modified memory blocks in the memory unit to be replaced to the available memory unit while the local OS is quiesced; and
a partition unit replacement (PUR) driver for providing a data conduit between the local OS and the global system hardware, the PUR driver comprising a memory transfer callback that instructs the transfer of data by the global system hardware.

15. The computing device of claim 14, a processor among the at least one processor selected as a controlling processer, the controlling processor configured to quiesce the local OS by mitigating interrupts and memory modification to the first partition.

16. The computing device of claim 14, respective partitions of the plurality of partitions executing an independent instance of the local OS.

17. The computing device of claim 14, the global system hardware comprising at least one of a service processor, a direct memory access (DMA) engine, or a baseboard management controller.

18. The computing device of claim 14, respective memory blocks associated with a modify flag, a modified memory block identified by a modify flag that is set and an unmodified memory block identified by a modify flag that is not set.

19. The computer-readable memory of claim 10, the quiescing comprising quiescing the local operating system by mitigating interrupts and memory modification.

20. The computer-readable memory of claim 10, the PUR driver comprising a platform-specific driver.

* * * * *